Aug. 13, 1929.　　　　K. E. PEILER　　　　1,724,678
METHOD OF AND APPARATUS FOR FEEDING MOLTEN GLASS
Filed Oct. 19, 1923　　　10 Sheets-Sheet 1
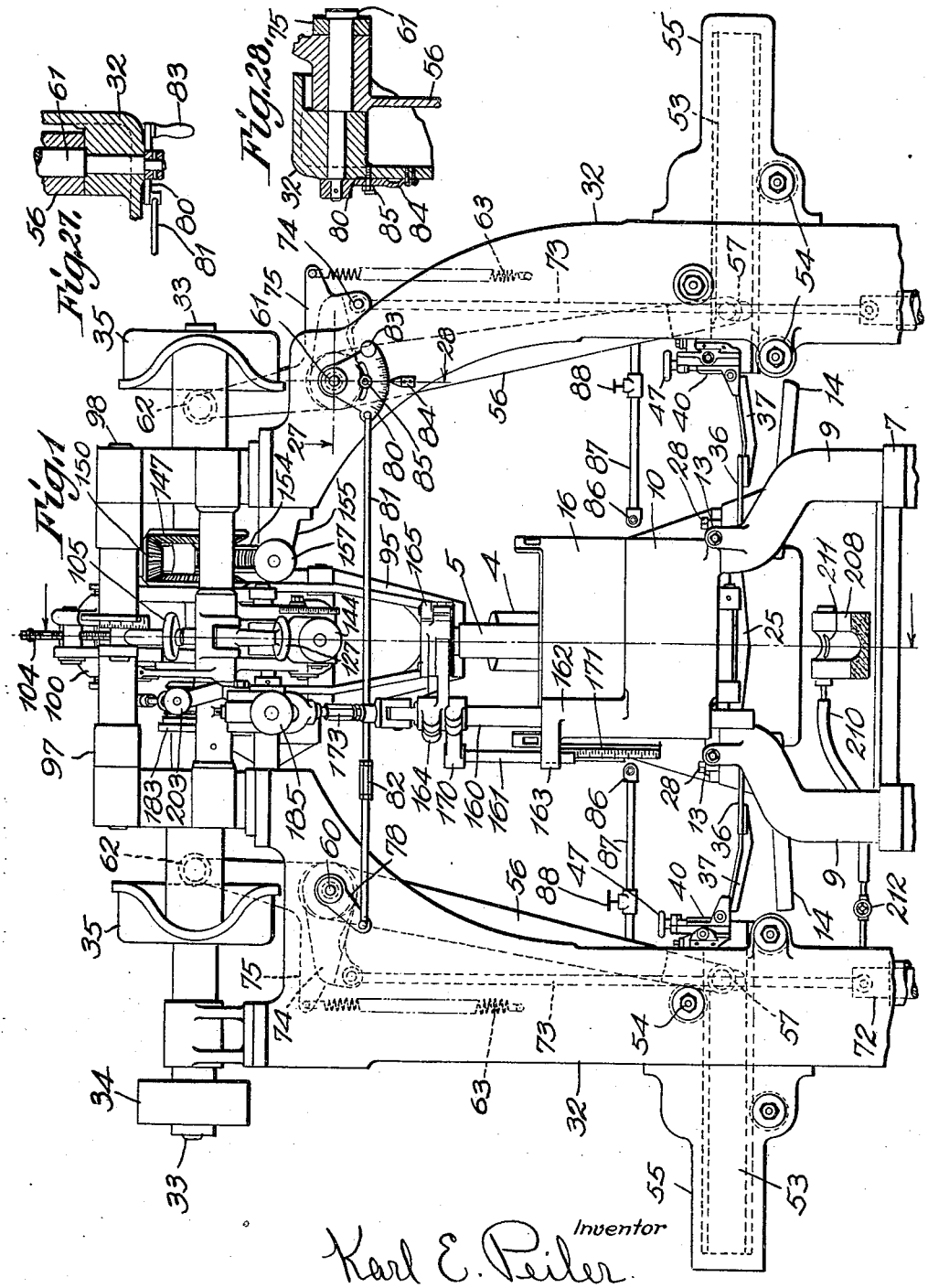
Inventor
Karl E. Peiler

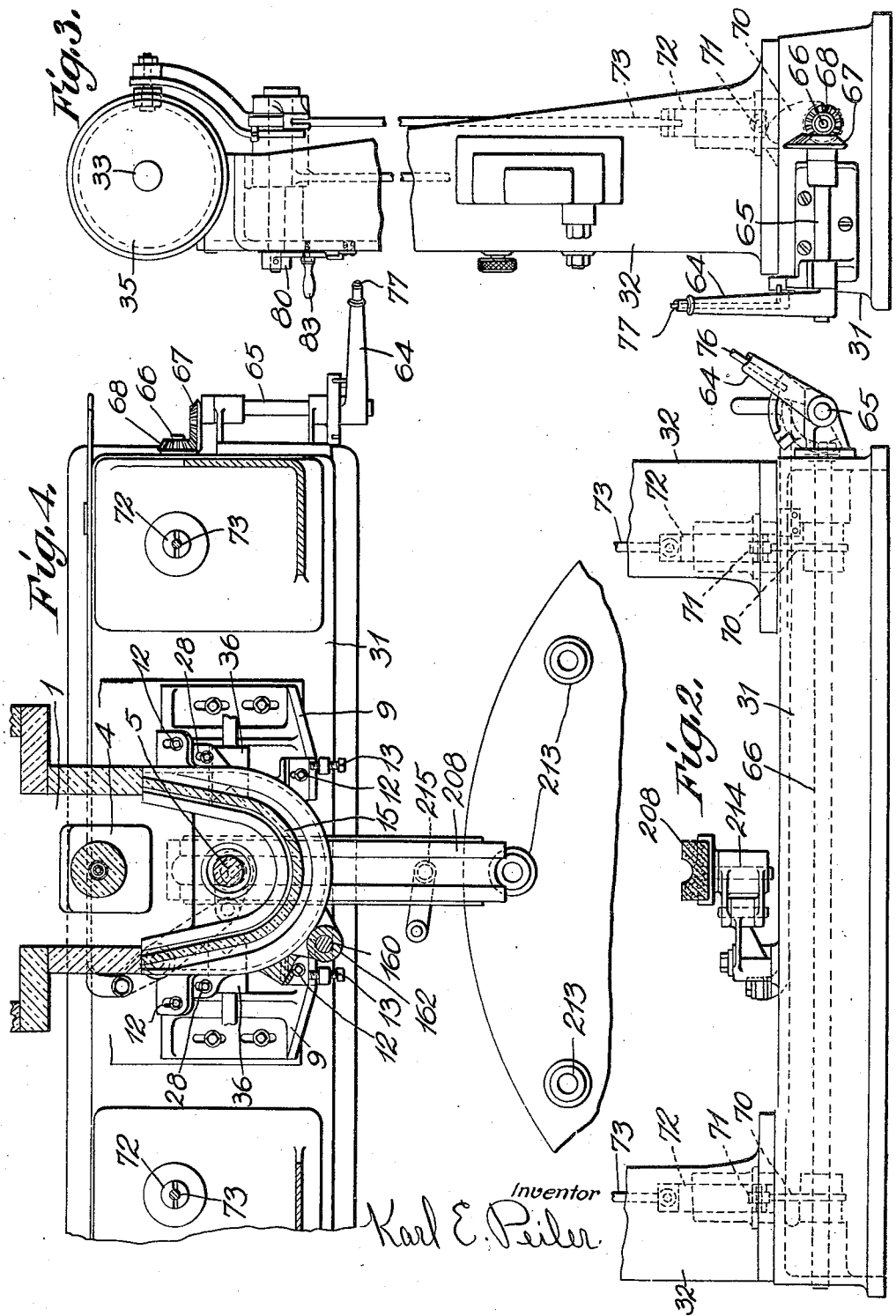

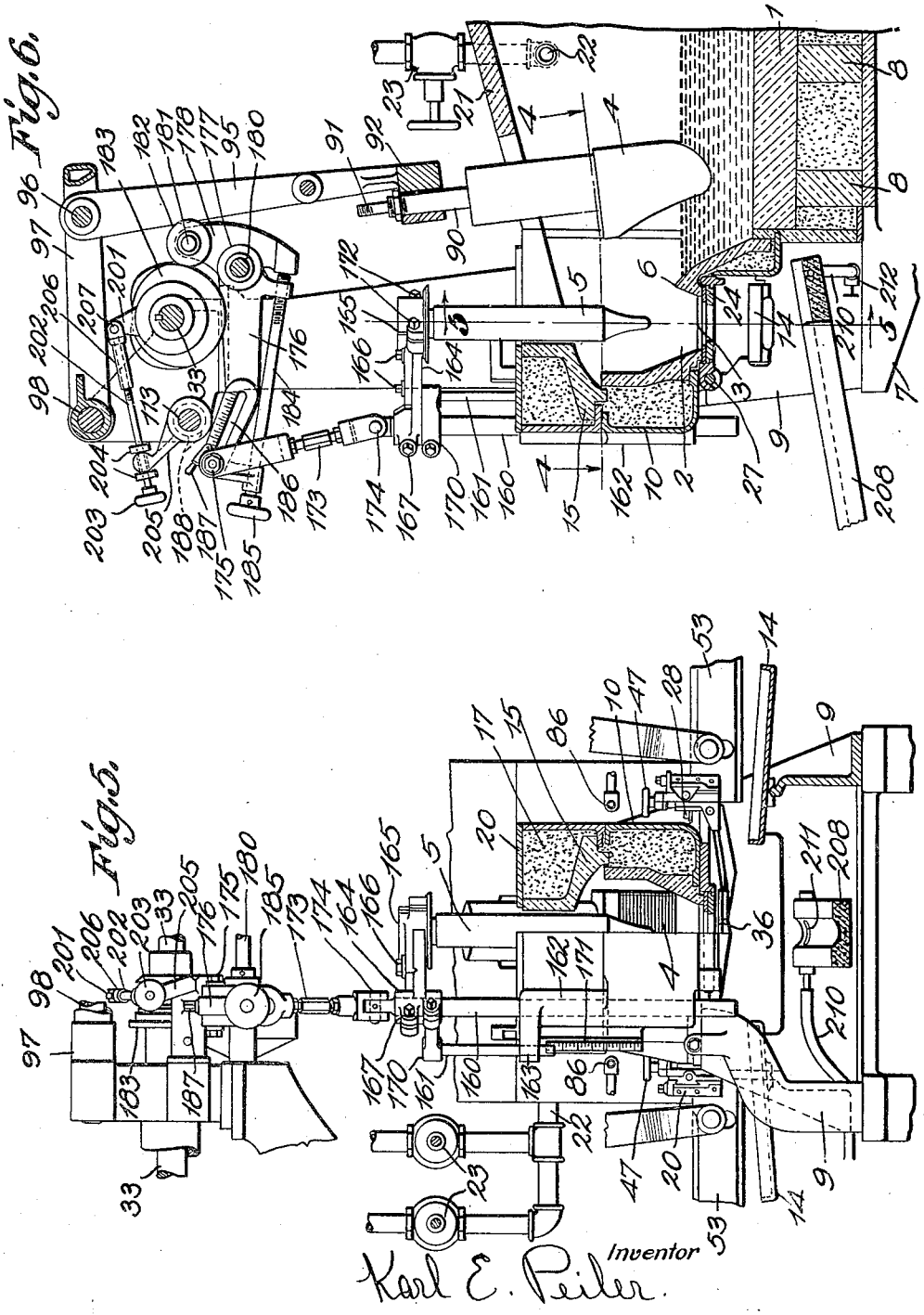

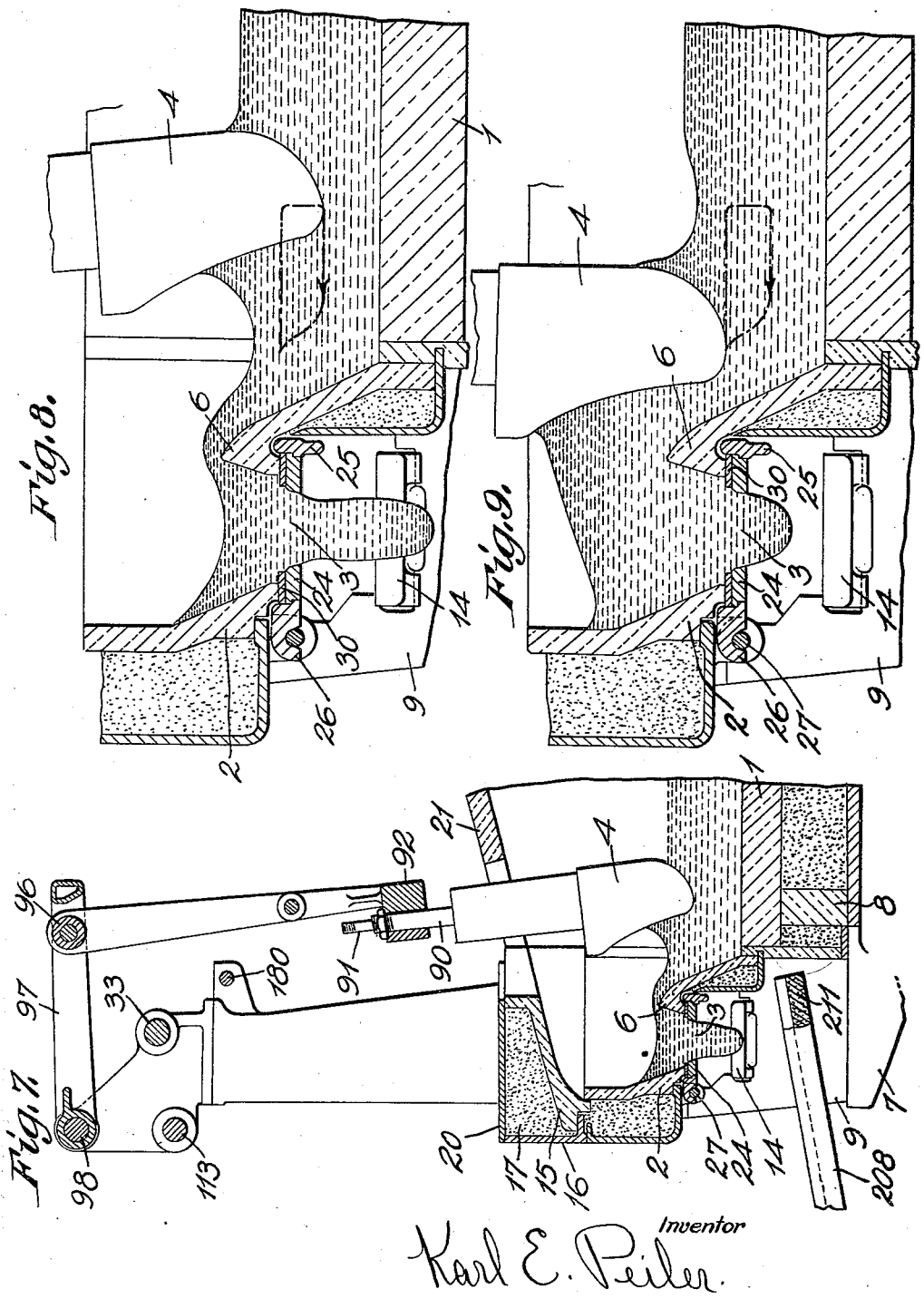

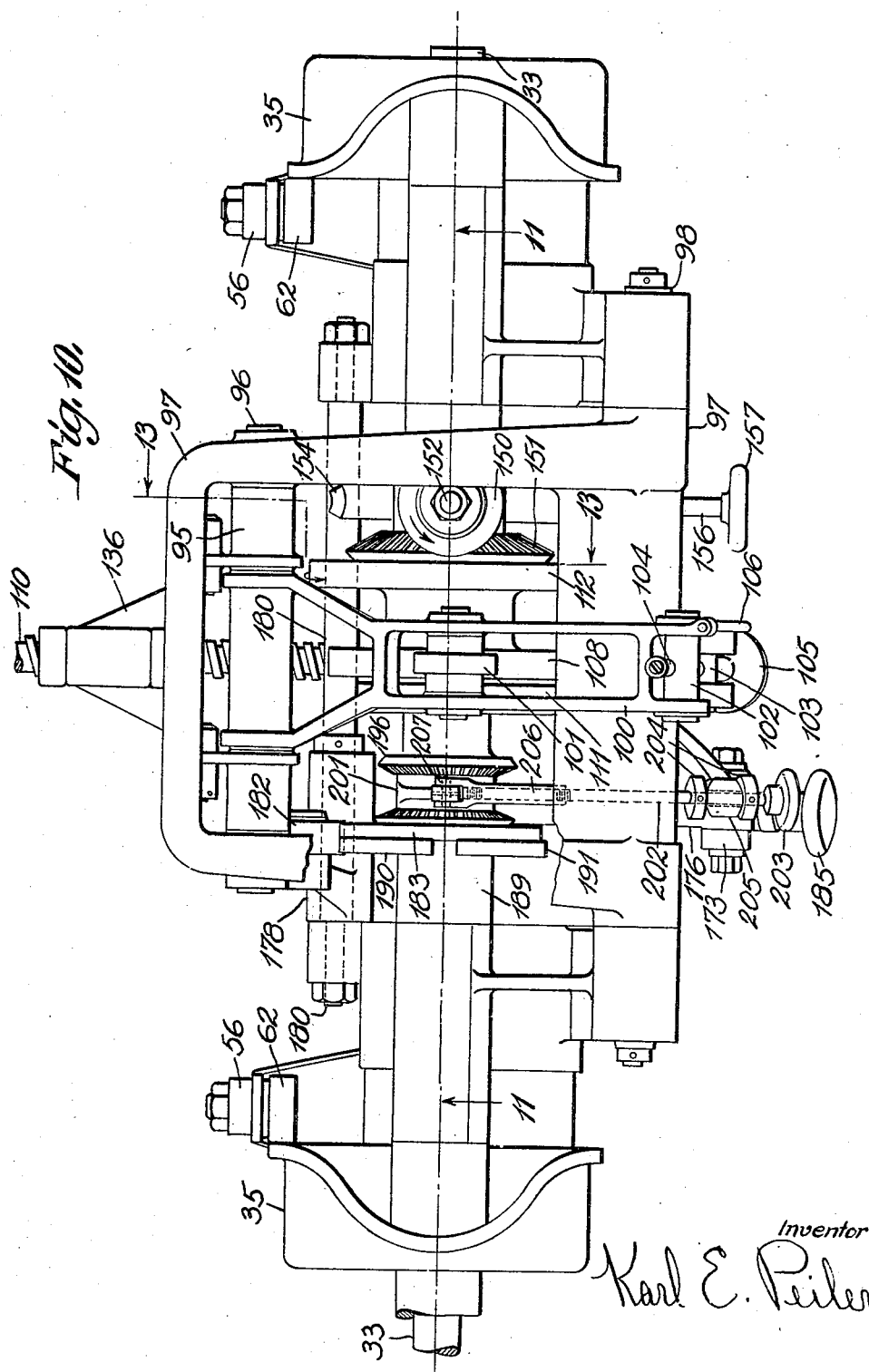

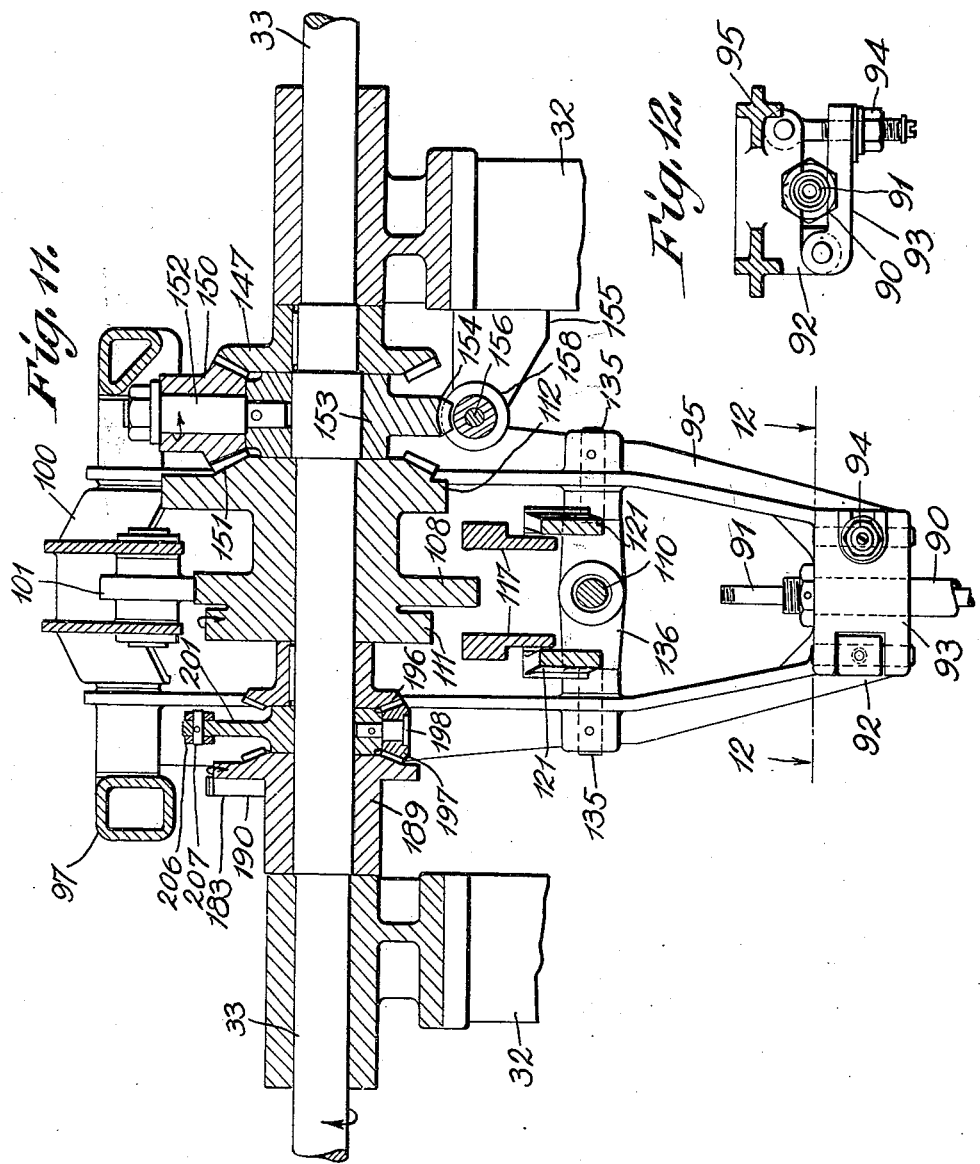

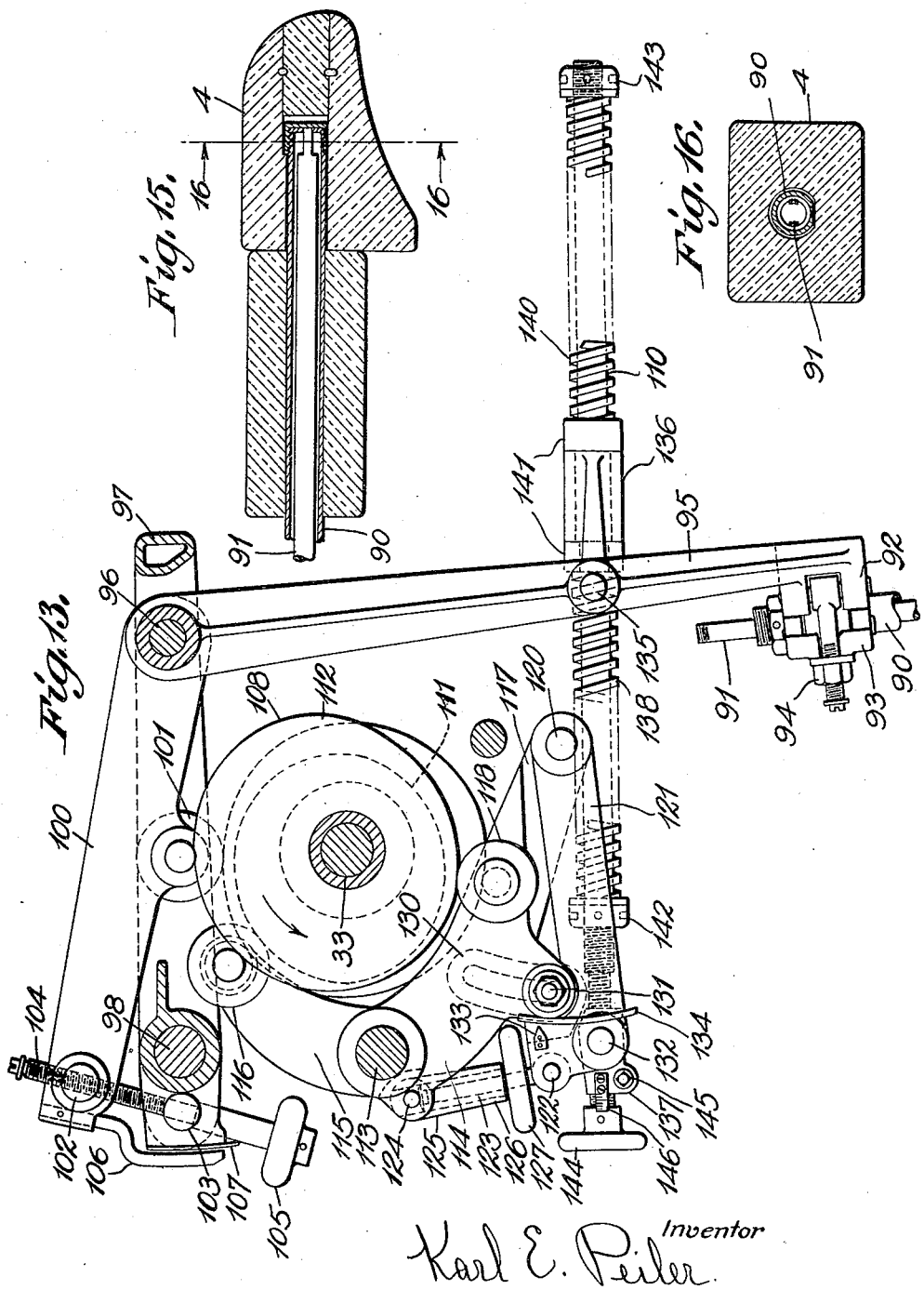

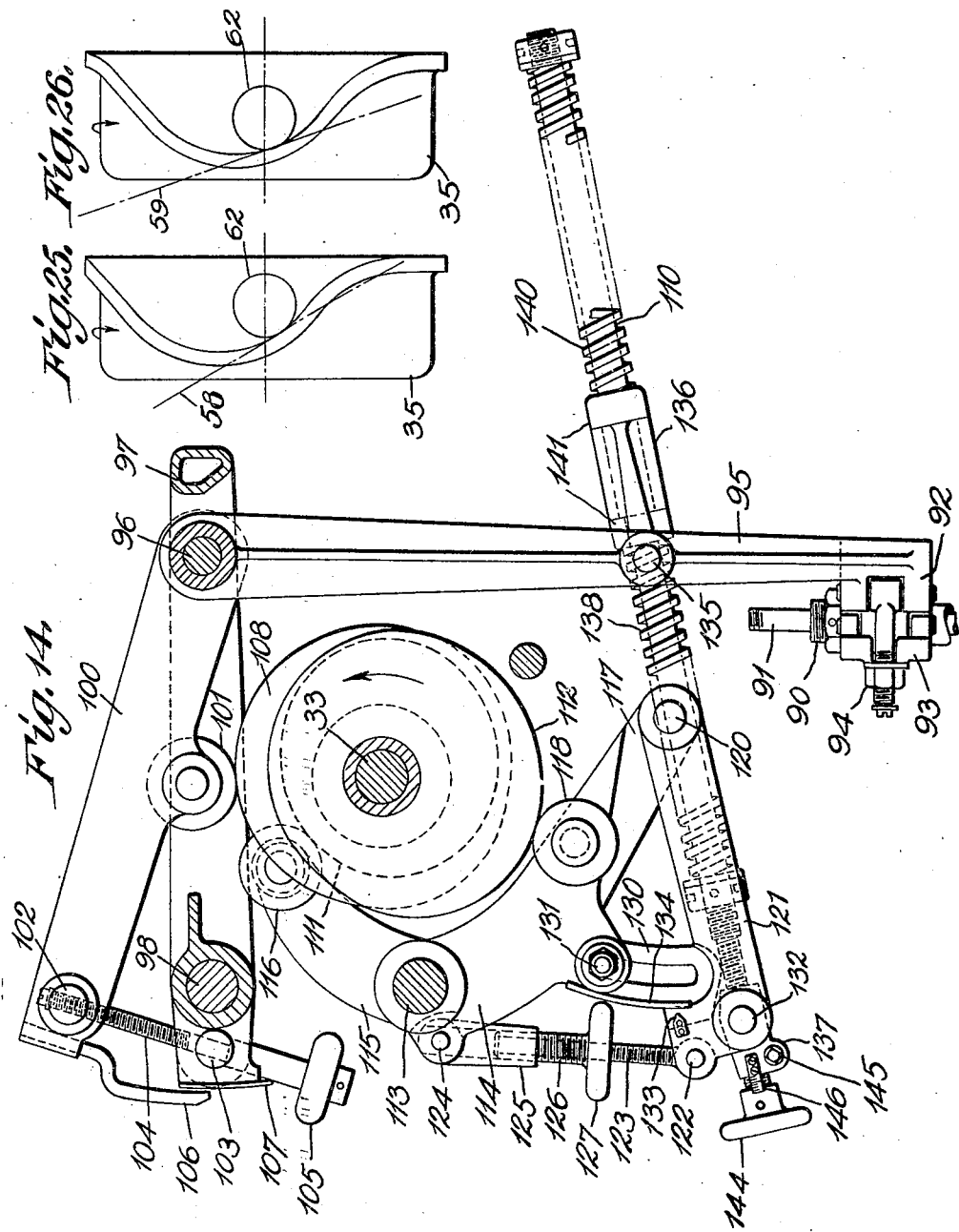

Aug. 13, 1929. K. E. PEILER 1,724,678
METHOD OF AND APPARATUS FOR FEEDING MOLTEN GLASS
Filed Oct. 19, 1923 10 Sheets-Sheet 9
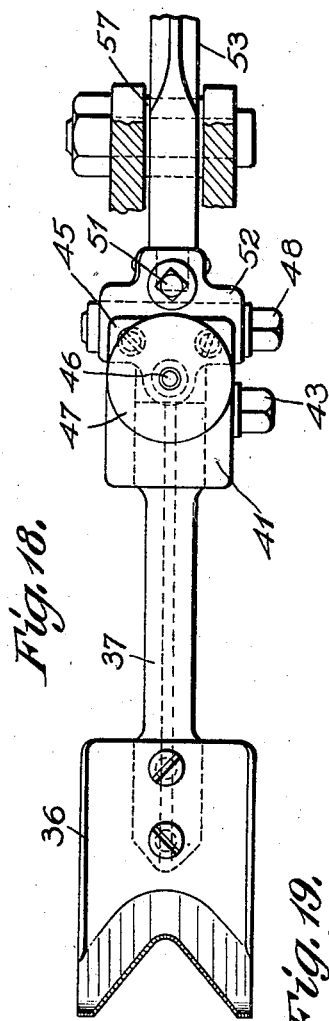
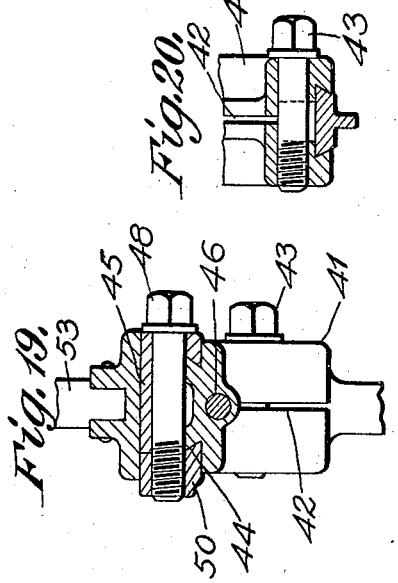
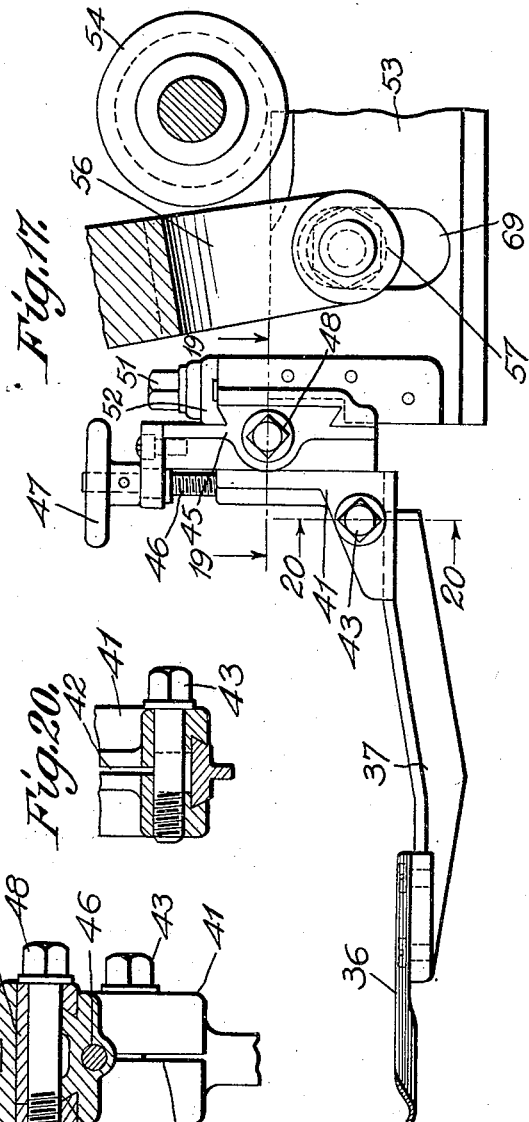
Inventor
Karl E. Peiler Aug. 13, 1929.  K. E. PEILER  1,724,678
METHOD OF AND APPARATUS FOR FEEDING MOLTEN GLASS
Filed Oct. 19, 1923   10 Sheets-Sheet 10
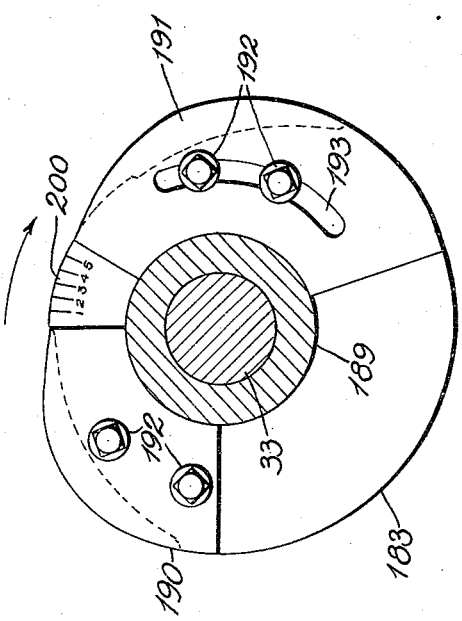
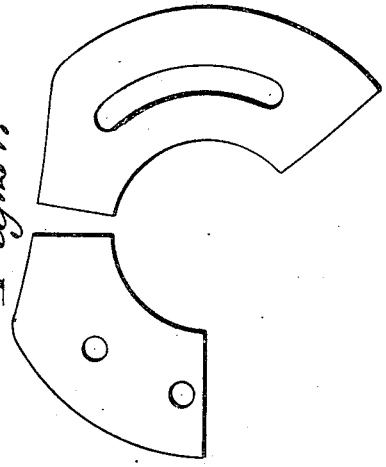
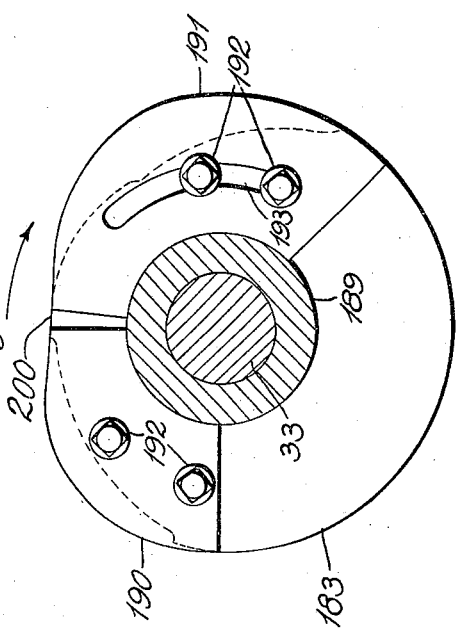
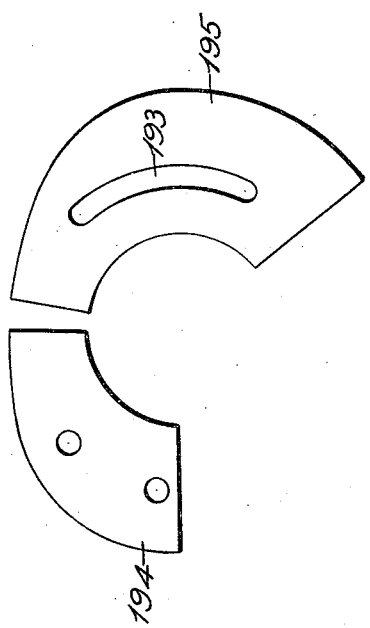
Karl E. Peiler, Inventor Patented Aug. 13, 1929.

1,724,678

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD OF AND APPARATUS FOR FEEDING MOLTEN GLASS.

Original application filed May 5, 1919, Serial No. 294,793, and in Australia, Great Britain, Mexico, and New Zealand May 5, 1919. Divided and this application filed October 19, 1923, Serial No. 669,479.

This invention relates to the segregation and separation of molten glass into mold charges. It has for its object the production of mold charges of suitable form and homogeneity to be most advantageously used in glass shaping machines, and it comprises a method and apparatus whereby such mold charges may be pre-formed while segregating them from a supply of molten glass in a furnace or container, and before bringing their external surfaces into contact with relatively cold molds or other supporting or forming means, and whereby the form and size of such charges may be controlled and varied at will, and without destroying their uniform consistency by the unequal chilling action of external or relatively cold molds or other supports or forming means.

It is a prominent characteristic of molten glass, that when it issues or is withdrawn from the furnace or container, and is exposed to the colder surroundings outside of the furnace, it acquires a partially chilled surface or skin, known in this art as "enamel." This enamel is coldest and stiffest on its outer surface, and gradually merges into the hot and more plastic interior of the glass. When a charge of this glass is delivered to a mold, any undue stretching, rupture, or infolding of the enamel will cause defects in the article being made. Any trapping of air by the glass, due to lapping or folding of the surface of the glass as it is delivered to the molds will also cause defects. To avoid these defects it is desirable to pre-form the mold charge, before it enters the mold, so that its external contour will closely approximate the interior contour of the mold walls, or at least that portion of the mold which receives the gather. This is of special importance in the making of blown glassware. A mold charge which is to form a narrow necked bottle, for example, should be pre-formed as an elongated cylinder with a tapering end, so that its entire surface may as nearly as possible contact equally with the mold walls for the same length of time. Unequal contact of different portions of the surface, or unequal duration of contact of the different portions tends to produce an unsymmetrically chilled and enameled blank or parison, which will not blow out uniformly, because the hotter portions will stretch more than the cooler portions, resulting in a poor bottle having a wall of uneven thickness.

These conditions have evidently been recognized to some extent by the handgatherer, practicing his ancient art, who by manipulation of his pontil or gathering rod during the gathering operation pre-formed his gather or mold charge, as well as he could by this primitive method, to fit the mold, or that portion of the mold that receives the gather, thus attempting to avoid undue deformation of the mold charge when deposited in the mold. On the other hand these conditions have received little or no attention in the gathering or feeding of molten glass as heretofore practiced by machine or other automatic methods.

The present invention accomplishes this preliminary shaping or pre-forming of mold charges by the adjustable operation of impelling means operating periodically in timed relation with suitable severing means. The impelling means periodically varies in regular successive cycles the depth of glass in a container having an outlet through which the glass is discharged and below which the mold charges are formed and severed by the severing means. One modification of the invention also makes use of secondary impelling means operating in adjustable timed relation to the first impelling means and coacting with the outlet and with the severing means, convenient adjustments being provided to allow immediate control of the severing means and of the secondary impelling means as to relative time of operation, speed and position.

Various adjustments of both impelling means as well as of the severing means to control and vary the form of the gathers and mold charges during continuous operation are herein described as operating adjustments, that is they may be made while the machine is in operation, thus allowing the maintenance of the flow of glass and the uniform heat conditions which are so essential in proper operation of glass feeding apparatus. Stopping of the machine to make adjustments would stop the flow of glass and would have the effect of allowing the glass to chill near the outlet and of changing the heat conditions. As a result the operating conditions would be changed so that the immediate effect of the adjustments could not be observed and employed as a guide in making these adjustments. In the present invention, on the other hand these adjustments may be made while the apparatus is operating, so that the progressive effect of these adjustments may be observed while they are being made, thus giving immediate and better control of the operation.

Fig. 1 is a general front elevation of the apparatus with the lower parts and base omitted.

Fig. 2 is a front elevation of the base, omitted from Fig. 1.

Fig. 3 is a side elevation showing some of the shear mechanism.

Fig. 4 is a plan view in section along the line 4—4 of Fig. 6 showing also the delivery chute and a portion of the molding machine.

Fig. 5 is a front elevation taken partly in section of the center portion of the machine, and shows the impellers, outlet and shear carriers, with the right hand shear in place and the left hand shear omitted.

Fig. 6 is a side elevation taken partly in section along the center line of Fig. 5 with the shear mechanism omitted, and shows the mounting of the primary and secondary impellers as well as the driving connection and adjustments for stroke and position of the secondary impeller.

Fig. 7 is a side elevation partly in section along the center line of the machine and shows the machine equipped with a single impeller only, the secondary impeller not being used.

Figs. 8 and 9 are enlarged views of the single impeller of Fig. 7 coacting with the temporary holder or container over the orifice and illustrating their action.

Fig. 10 is a plan of the mechanism for driving the impellers.

Fig. 11 is a sectional elevation along the line 11—11 of Fig. 10 showing the cam shaft and cams for driving the impellers, and their adjustments, as well as the mounting of the primary impeller.

Fig. 12 is a plan view in section along the line 12—12 of Fig. 11, and shows the chuck or holder in which the primary impeller is removably mounted.

Fig. 13 is a section in elevation along the line 13—13 of Fig. 10 and shows the driving mechanism of the primary impeller with the parts adjusted to give this impeller its shortest stroke.

Fig. 14 is an elevation similar to Fig. 13, but showing the parts adjusted to give the primary impeller a longer stroke.

Figs. 15 and 16 are sections of the primary impeller showing its construction, Fig. 15 being a longitudinal section and Fig. 16 a plan taken in section along line 16—16 of Fig. 15.

Fig. 17 is a front view of the left hand end of the shear carrier with its shear blade.

Fig. 18 is a plan view projected from Fig. 17.

Fig. 19 is a plan view in section taken on the line 19—19 of Fig. 17.

Fig. 20 is an end elevation in section taken on the line 20—20 of Fig. 17.

Figs. 21 and 22 are left side elevations of the cam governing the motion of the secondary impeller and showing removable portions of the cam surface in different adjusted positions.

Figs. 23 and 24 show different shapes of the removable portions or lobes of the secondary impeller cam surface.

Figs. 25 and 26 are rear elevations of the right shear cam showing the effect of its contour on the cutting speed.

Figs. 27 and 28 are sectional views on the lines 27 and 28 respectively, of Fig. 1, showing the adjustable mounting of the shear levers by which the cutting speed may be varied.

The invention is herein shown embodied in a machine having the necessary mechanical movements and adjustments and cooperating with a conduit projecting from a glass furnace from which the molten glass is thus delivered in mold charges to an associated molding or shaping machine.

The molten glass flows from a glass furnace into a channel or conduit 1 provided at its outer end with a holder or container 2 for the glass having an outlet 3 for discharge of the glass. This container 2 is partly separated from the channel or conduit by the wall or dam 6 so that the glass will not flow into it unless acted upon by the impeller 4. The wall or dam 6 may be omitted and the holder or container may be at a lower level, or the glass may be at a higher level so that the glass will flow into the container from the channel, but in order to secure better control of the discharge of the glass, the arrangement shown is preferred. If desired, the depth of glass in the channel may be regulated by a vertically adjustable gate placed near the furnace such, for example, as that shown in Patent No. 1,349,551, granted on the application of K. E. Peiler on August 10, 1920. The glass at the outer end of the conduit 1 is acted upon by the impeller 4 which may be a primary impeller cooperating with another or secondary impeller, or it may as shown in Figs. 7, 8 and 9 be the only impeller employed. The lower end of this impeller moves in the path indicated by the dot and dash lines of Figs. 8 and 9 in successive cycles, propelling the glass forward and periodically raising its level in the container as shown in Fig. 9. The glass discharges through the outlet periodically in timed relation to the strokes of the impeller and forms below the outlet into successive gathers from which mold charges are severed by the shear blades reciprocating below the outlet. The glass discharging from the outlet may be acted upon by the secondary impeller 5, or this secondary impeller may be omitted so that the discharge of the glass is controlled only by the periodically varying depth of the glass in the container 2. The separated mold charges fall upon a moistened chute and slide upon it to the molds mounted on the table of the associated shaping machine.

The channel 1 is made of refractory material and is surrounded on the bottom and sides by heat insulation. The container 2 is held in an iron frame or case 10 which also serves as a retainer for heat insulation so that the container is surrounded with insulation except at the outlet. The bed 7 is carried by the same foundation which supports the base 31 of the machine. It serves to support the channel 2 by means of intermediate refractory supports 8, and carries two brackets 9 which support the container case 10 clamped thereon by screws 12. The brackets 9 also carry set screws 13 which bear against projections on the container case and hold the container against the end of the channel. These screws may be adjusted to allow for expansion and contraction of the channel and container. The brackets also carry removable drip pans 14 for receiving the cooling water dropping from the shear blades and from the sprays.

Over the container is a cover 15 of refractory material (Fig. 7) carried in a metal case 16 which also serves as a retainer for heat insulation 17, the metal plate 20 serving to keep the insulation in place. The plate 20 and cover 15 have openings into which the impeller 4 may project in making its forward stroke. This cover may be modified as shown in Figs. 5 and 6 by enlarging the openings sufficiently to allow the secondary impeller 5 to project through it downward into the container. Back of this cover and over the channel is another refractory cover 21 which may also be similarly provided with heat insulation.

The channel and container are heated by suitable means, such as a gas burner 22 which projects through the side wall. This burner is provided with air and gas valves 23 for regulating the flame which partly fills the space over the molten glass. The products of combustion may be carried off by a suitable stack provided with dampers. The insulation acts to conserve the heat, and the radiation from the rear assist in heating the outlet end, thus tending to maintain a uniform temperature throughout.

Clamped against the container 2 is an outlet ring 24 made of refractory material. This ring is carried in a metal holder 25 hinged by an open-sided bearing 26 on a pivot 27 to allow ready removal and drawn up against an abutment by screws 28. Between the outlet ring and the container is a packing 30 of refractory clay. The object of this construction is to allow the size of the outlet to be changed at will by easy and rapid change of the outlet rings. In practice an outlet ring of the size desired is placed in the holder and covered with sufficient plastic clay to form the packing 30. The holder is then hooked over the pivot 27 and drawn up against its abutment, squeezing the plastic packing into place.

The frame of the machine is carried by the base 31 (Figs. 2, 3 and 4) and surrounds the channel and container. The base carries columns 32 with suitable brackets at the upper end to carry the drive shaft 33 and various pivot shafts. The drive shaft may be driven by a pulley 34 as shown and may be connected to a shaping machine by any suitable means for synchronizing its operations with those of this machine. The shaft 33 carries cams 35 for driving the shears and serves as a bearing for other cams which drive the impellers.

The shear blades 36 are fastened to shanks 37 which are carried in adjustable heads or holders 40 (Figs. 17 to 20 show the right hand holder) by means of which the blades may be adjusted up, down and sidewise relatively to each other and to the outlet 3, so as to sever the glass at the desired position, and to operate to the best advantage. The shank 37 of each blade is removably held in a vertical slide 41, split in its lower portion at 42 (Figs. 19 and 20) and clamped by means of the clamp screws 43. The vertical slide 41 fits a guideway 44 on a cross slide 45, as shown in Fig. 19, and may be adjusted up and down by means of the adjusting screw 46, provided with a hand wheel 47 and may be clamped in place in its guideway by the screw 48 and clamp 50. The cross slide 45 which carries the vertical slide 41 and its adjustment, fits in a guideway (Fig. 17) and may be clamped in place by the screw 51 and clamp 52 thus allowing the shear blades to be adjusted for transverse position and clamped to place. The shear blades may be adjusted endwise by moving their shanks in and out in their holders, either for the proper initial setting or for a controlling adjustment, although a preferable operating adjustment for this purpose is provided. In this way the shear blades may be moved in three planes so as to bring them into proper relationship to the outlet and into proper alignment with each other. To move the severing plane to a higher or lower level, both shear blades are adjusted up and down as desired, the proper alignment between them being maintained by turning both hand wheels 47 the same amount.

The shear holders above described are carried on the inner ends of the carriers 53 guided between grooved guide rollers 54 pivoted on the columns 32. The outer ends of these carriers are protected by the guards 55 projecting from the columns. The carriers 53 are moved toward and away from each other by means of levers 56 carrying at their lower ends rollers 57 which engage with slots 69 in the carriers. The shear levers are pivotally mounted on studs 60 and 61 carried on the columns 32. The upper ends of the shear levers are provided with cam rollers 62 which are held by suitable springs 63 against the shear cams 35 which are fixed on the main shaft 33, the cams being shaped to move the shear blades to and from each other to cut off the successive mold charges when formed.

The shears may be stopped in their retracted positions without stopping the rest of the machine by moving the hand lever 64 to the position shown in Figs. 2, 3 and 4. This rocks the shaft 65 and transmits the motion to shaft 66 by means of bevel sector 67 and bevel gear 68. This shaft carries two cams 70 against which bear the rollers 71 carried by the slides 72 so that the rocking of the shaft 66 raises or lowers them. These slides are connected by means of connecting rods 73 with the arms 74 which are pivoted on the same studs 60 with the shear levers 56. These arms bear against the lower side of the shear lever extensions 75. In this way the shear levers may be positively held against the action of the springs 63 to hold the shears inactive in their retracted positions while the cams continue to rotate. By reversing the position of the hand lever 64, the arms 74 will be swung down and the shears will be allowed to resume normal operation. The hand lever 64 may be locked in position by means of the latch 76 worked by a knob 77.

For controlling the shape of the lower ends of the gathers, while the machine is in operation, an operating adjustment is provided for varying the rapidity with which the shear blades cut through the glass, by using earlier or later portions of the contour of the shear cams (Figs. 25 and 26). These cams are shaped to give a gradually decreasing speed to the shear slides toward the inner ends of their strokes so that by varying the point in the path of the slides at which severing begins the severing speed may be varied. For this purpose those portions of the pivot studs 60 and 61 which carry the shear levers 56 are made eccentric to the portions which are supported in the frame, the eccentricity of one pivot stud 61 being set downwardly (Figs. 1 and 2) and the eccentric portion of the other pivot stud 60 being set upwardly. This enables these eccentric pivotal supports for the shear levers to be adjusted toward or away from each other. When adjusted toward each other the shear blades meet and sever the glass at an earlier period, at a time when the respective cam rolls 62 are in contact with a steeper or more inclined portion of the cam contour, as shown in Fig. 25, so that the severing operation is performed in shorter time, thus making a blunter ended gather. On the other hand, when the eccentric portions of the studs 60 and 61 are turned outwardly, the shear blades meet and sever the glass at a later period in their stroke, at which time their respective cam rolls 62 engage with the less inclined contours of the shear cams 35 as shown in Fig. 26, thus severing the glass more slowly, and making a more pointed end on the gather. The relative inclination of the cam contour at the two cutting positions is shown by the tangent lines 58 and 59. The pivot studs 60 and 61 for the shear levers are turned to utilize their eccentric movements by means of levers 78 and 80 (Figs. 1, 27 and 28) which are connected by a rod 81 so as to turn both pivot studs at the same time and to the same extent, but on account of one stud having its eccentric above and the other below the center, the pivotal points of the levers 56 are moved in opposite directions. The connecting rod 81 may be adjusted for length by a right and left hand threaded nut 82. One of the levers 80 is provided with a handle 83 for turning the eccentrics. The lever 80 is provided with a graduated scale or index to indicate the extent to which the eccentrics are turned. This scale is read in connection with the pointer 84 attached to the column. The eccentrics are clamped in any desired adjusted position by the screw 85.

The shear blades 36 are cooled between their successive severing operations by means of water sprays 86 (Figs. 1 and 5), supplied by pipes 87 and regulated by valves 88. The water from the sprays strikes the blades in their retracted positions and is finally caught by the drain pans 14 from which the water is drained away.

The impeller 4 is constructed of refractory material carrying a stiffening metal core 90 as shown in section in Figs. 15 and 16. The metal core is provided with an inner metallic tube 91 to which cooling air is supplied to keep the core below the temperature at which it would be bent by its working stresses. The impeller is fastened by the upper end of its core in a holder 92 having a pivoted jaw 93 (Fig. 12) which may be clamped down by the nut 94. The holder or chuck is carried at the end of a swinging arm 95 which is pivoted at its upper end on the pivot 96 about which the impeller is capable of horizontal swinging movement. To allow the raising and lowering of the impeller during its horizontal swinging movement the pivot 96 is carried by the vertically swinging guide arm 97 pivoted on the shaft 98. This guide arm 97 carries a lever 100 pivoted on the pivot 96 and carrying the cam roll 101. The outer ends of the guide arm 97 and the lever 100 carry swivel blocks 103 and 102 which are connected by the screw 104 carrying the hand wheel 105. This screw is threaded into the upper swivel block 102 and revolves freely with a shouldered bearing against the lower swivel block 103. Thus by turning the hand wheel 105 the relative angular position of the guide arm 97 and lever 100 may be changed, changing the position of the cam roll relative to the guide arm. The effect of this is to change the vertical position of the impeller. A pointer 106 carried by the lever 100 indicates on a scale 107 carried by the guide arm the vertical position of the impeller. The cam roll 101 bears against the cam 108 which is so shaped as to raise and lower the impeller as desired.

To impart horizontal swinging movements to the impeller, the swinging arm 95 is connected with an adjustable system of levers by the connecting rod 110 and cams 111 and 112 are provided to oscillate the levers. On the shaft 113 is pivoted a lever 114 having an upwardly projecting arm 115 carrying a cam roll 116 and a downwardly projecting arm 117 carrying another cam roll 118. The upper cam roll 116 bears against the left hand cam 111 which serves to move the impeller from front to rear. The lower cam roll 118 bears against the right hand cam 112 which serves to move the impeller forwardly or toward the outlet. The two cams are shaped so as to impart the desired horizontal swinging movements to the impeller. The lower arm of the lever 117 carries a pivot 120 on which an adjusting lever 121 is pivoted. The outer end of this adjusting lever 121 carries a pivot 122 on which the screw 123 is swivelled. The lever 114 also carries a pivot 124 on which a threaded socket 125 is swivelled. The sleeve 126 provided with the hand wheel 127 is threaded inside and outside and serves to connect the screw 123 with the socket 125. The threads on the screw and socket are respectively left handed and right handed so that turning the hand wheel 127 will increase or decrease the distance between the pivots 122 and 124 thus swinging the adjusting lever 121 about its pivot in relation to the lever 114. The adjusting lever 121 is provided with a slotted extension 130 which embraces the clamp screw 131 by means of which the lever 114 and 121 may be clamped in any set position. In this way by turning the hand wheel 127 and changing the setting of the adjusting lever 121 the pair of pivots 132 to which the connecting rod 110 is pivoted may be raised or lowered, thus shortening or lengthening the effective driving radius of the system to decrease or increase the stroke of the impeller 4. The pointer 133 carried by the adjusting lever 121 indicates on a scale 134 carried by the lever 114 the length of stroke imparted to the impeller 4.

The connecting rod 110 is made in sections connected by springs so as to form a driving connection for the impeller yielding in both directions. This prevents damage which might be caused by the impeller striking obstructions or by working in glass which has become chilled. The pair of pivots 135 on the swinging arm 95 carry a yoke 136 (Fig. 10) through which the rod 110 is free to move. The pair of pivots 132 on the lever 121 carry a yoke 137 in which the rod 110 is threaded. This rod carries springs 138 and 140 which hold the loose collars 141 against the yoke 136 and which may be adjusted to yield at the desired pressure by turning the nuts 142 and 143 which are threaded on the rod 110. This rod is enlarged where it passes through the yoke 136 to form shoulders against which the loose collars 141 bear, thus locating the yoke 136 in a definite position on the rod while allowing the yielding of the connection when necessary. At the end of the rod 110 is fixed a hand wheel 144 by means of which the rod may be revolved so as to screw it in and out of the yoke 137 to alter the effective length of the connection between the lever 114 and the swinging arm 95, thus allowing the working range of the impeller to be shifted horizontally without altering the shape of the path through which it makes its periodic movements. The yoke 137 is split in its threaded portion and provided with a clamp screw 145 by means of which the rod 110 may be clamped to prevent rotation. A scale 146 is carried by the yoke 137 in such a position that the edge of the hub of the hand wheel 144 comes opposite the graduations on the scale, thus serving to indicate the horizontal working position of the impeller.

To further control the movements of the impeller 4 the impeller cams 108, 111 and 112 are so driven that the timed relation between the impeller and the shears may be altered while the machine is operating. The impeller cams are loose on the shaft 33. To this shaft is keyed a bevel gear 147 which drives a bevel idler pinion 150 which in turn engages the bevel gear 151 formed at the right of the cam 112. The impeller cams are thus driven in a direction opposite to that of the shaft 33. The idler pinion 150 rotates on a stud 152 carried by the piece 153 which is loosely mounted on the shaft 33 and on which the worm wheel sector 154 is formed. At the upper end of the right hand column 32 is a bracket 155 which serves as a bearing for the shaft 156 carrying the hand wheel 157 and worm 158. This worm engages the teeth of the worm wheel sector 154 so that by turning the hand wheel 157 the piece 153 may be rotated about the shaft 33, and the bevel pinion 150 may be advanced or retarded relatively to the shaft and the drive gear 147. This has the effect of advancing or retarding the impeller drive cams 108, 111, 112 relatively to the rest of the machine, thus advancing or retarding the operation of the impeller relatively to the operations of the rest of the machine.

The raising and lowering cam 108, which governs the rise and fall of the impeller 4, and the swinging cams 111 and 112, which impart the horizontal swinging movements to the impeller 4, are formed so that the end of the impeller moves in the closed path indicated by dot and dash lines in Figs. 8 and 9 in the direction shown by the arrow. The effect of this motion is illustrated in Figs. 8 and 9. In making its forward stroke the impeller 4 pushes some of the glass before it raising the level in the container 2 as shown in Fig. 9. This accelerates the discharge of glass through the outlet 3 on account of the increasing pressure due to the gravity head. As the impeller moves backwardly it carries some of the glass back with it and lowers the level of the glass in the container as shown in Fig. 8. This has the effect of decreasing the gravity head of glass over the outlet and decreasing or retarding the discharge through the outlet. In this manner the discharge of glass through the outlet is periodically accelerated and retarded thus giving a control of the discharging action.

The discharging glass accumulates below the outlet in successive suspended masses or gathers from each of which a mold charge is severed by the shears 36 which operate in timed relation to the strokes of the impeller. The time of accumulation and formation of the suspended gathers is thus controlled by the strokes of the impeller so that a suspended gather is always present for the shears to sever a mold charge at each one of their strokes.

The size and general shape of the successive gathers and of their resulting mold charges may be varied and controlled, while the machine is operating, by varying and controlling the extent, character, and time of occurrence of the periodic rise and fall of the glass level in the container 2. This may be done by the various adjustments provided in the parts driving and positioning the impeller 4. For the purpose of making these adjustments, the separate hand wheels above described have been provided and their use will now be explained.

By turning the hand wheel 127 the horizontal swinging stroke of the impeller may be increased or decreased, thus increasing or decreasing the amount of glass which is pushed forward by the impeller. Another way of varying the amount of glass pushed forward by the impeller, is by turning the hand wheel 105 which varies the depth at which the impeller works in the glass. These two adjustments may therefore be used to increase or decrease the amount of glass pushed forward by the impeller. The effect of increasing this amount is to produce an increase in the depth of glass in the container 2 throughout the entire operation, that is the highest level will be greater than before and the lowest level will also be greater than before, thus increasing the quantity or weight of glass discharged to form each mold charge. To secure changes of large magnitude in the weight of the mold charge it is preferable to vary the impeller stroke while to secure changes of lesser magnitude the depth at which the impeller works in the glass is preferably varied. The hand wheels 127 and 105 therefore give a control of the quantity or weight of glass in the mold charge.

By turning the lower hand wheel 144 the working range of the impeller may be shifted forward or backward relative to the container 2. The effect of moving this working range further forward is to give greater periodic depth variation of the glass in the container 2 and to give a faster, sharper increase and decrease of the depth. Moving the working range of the impeller further back gives smaller periodic depth variation of the glass in the container and also gives a slower and more sluggish variation of this depth. These effects may be used to aid in varying or controlling the general shape of the gather and its resulting mold charge. If a short, compact gather is desired, the impeller is worked in its forward position giving a greater and sharper variation of depth. This gives a faster and greater acceleration to the discharge of glass followed by a rapid retardation of the discharge, which tends to produce a short compact gather, thus making the resulting mold charge short and compact. Working the impeller in a position further back, on the other hand, gives a smaller and slower depth variation. This gives a smaller but more protracted acceleration of discharge, followed by less retardation. This tends to produce a longer and more attenuated gather of glass, hence a longer mold charge of smaller diameter.

By turning the hand wheel 157 and altering the time of operation of the impeller 4 relatively to the other operations of the machine, the periodic depth variation in the container is made to occur in varying time relationship to the severing operation of the shears. The gather of glass accumulated below the outlet may thus be made to form sooner or later relative to the time at which it is severed, thus allowing more or less time for it to stretch or elongate before it is severed. Thus by turning the hand wheel 157 to advance the operation of the impeller 4 a longer and more attenuated mold charge may be delivered, while by retarding the operation of that impeller, a shorter and more compact mold charge will be delivered. By properly choosing the size of the outlet ring 24 the gathers suspended below the outlet will have the desired diameter. The ratio of their length to their diameter and their general shape may then be controlled by the adjustments which have been described. These adjustments also give control of the weight or quantity of glass in the gathers. Thus both the size and the shape of the mold charges may be controlled and varied at will.

The impeller 4 just described may be used as a primary impeller in conjunction with a secondary impeller 5 for the purpose of further controlling the extrusion and formation of the gathers below the outlet. This secondary impeller 5 is made of refractory clay and is guided for vertical movement into or through the outlet ring 24, and concentrically therewith, by the guide shafts 160 and 161, sliding in bearings 162 and 163 respectively, which are formed on the container case 10. (Figs. 1, 5 and 6.) The guide shaft 160 carries an arm 164 to which a split holder 165 carrying the secondary impeller 5 is detachably secured by clamp screws 166. The arm 164 is clamped to the shaft 160 by the screw 167 allowing the secondary impeller 5 to be swung about the shaft 160 to adjust it into alignment with the outlet 3. The shaft 160 also carries an arm 170 in which the second guide shaft 161 is fastened. The lower end of this shaft comes opposite the scale 171 fastened to the container case 10. This scale is graduated to indicate the positions of the lower end of the secondary impeller 5 relative to the lower side of the outlet ring 24. The secondary impeller is clamped in its holder 165 by screws 172 and may be quickly exchanged for another impeller of any desired shape.

The secondary impeller and its carrier are suspended by the connecting rod 173 and its pivots 174 and 175 from the horizontal lever 176 pivoted by its hub 177 on the hub of the vertical lever 178 which is pivoted on the shaft 180. The two levers 176 and 178 are thus pivoted one on the other and on the shaft 180 as a common pivot. The vertical lever 178 has at its upper end a stud 181 carrying a cam roll 182 which bears against the secondary impeller cam 183 (Fig. 6). The horizontal lever 176 carries an adjusting screw 184 provided with a hand wheel 185. The end of this adjusting screw bears against the vertical lever 178 bringing the weight of the secondary impeller and its guiding parts against the cam 183. This cam thus governs the periodic rise and fall of the secondary impeller. By turning the hand wheel 185 and revolving the adjusting screw 184 the relative angular position of the two levers 176 and 178 may be varied, thus raising or lowering the working range of the secondary impeller movement. The length of stroke of the secondary impeller may be varied by sliding the pivot 175 of the connecting rod 173 in the slot 186 provided in the lever 176. This changes the effective length of the lever. The pivot 175 is provided with a nut by means of which it may be clamped in any desired position, indicated by graduations along the slot 186 to give the secondary impeller the desired length of stroke.

In cases where the cooperation of the secondary impeller 5 is not needed, or where for any reason it is desired to put it out of operation, it may be held out of operation in any desired vertical position, by means of a suitable latch 187 carried by the lever 176 and engaging with a supporting hook or projection 188 carried by the shaft 113. (Figs. 5 and 6.) It may be thus latched in its upper position entirely out of contact with the glass in the container 2, where the conditions permit or require the impelling work to be done by the primary impeller 4 alone, in which case the operations will be like those shown in Figs. 7, 8 and 9. In some other instances it may be desirable to hold the secondary impeller 5 inactive at a lower position, projecting into the glass or even through the outlet, as for example to add a uniform retarding effect to the discharge of the glass through the outlet, or to support the glass below the outlet. Such adjustments may be made by holding the lever 176 in its upper position by moving the latch 187 over the projection 188 (Fig. 6) with the cam roll 182 clearing the impeller cam 183 and adjusting the connection between the lever 176 and the impeller 5, so as to adjust the impeller to the position desired.

The secondary impeller cam 183 is composed of several parts as shown in Figs. 21 and 22 in left side elevation and in Fig. 11 in section. The greater portion of the working surface of the cam is formed in one piece with the hub 189 which is mounted loosely on the main shaft 33. The remainder of the cam surface is formed by the two removable lobes 190 and 191 which are attached to the main part of the cam by screws 192. The lobe 190 raises the impeller and is bolted in a fixed position on the main part of the cam by its screws. The lobe 191 which governs the fall of the impeller is slotted at 193 so that it may be adjusted to various angular positions relative to the remainder of the cam as indicated by the graduations shown in Fig. 22. In this way the lobe 191 may be set so as to increase or decrease the extent of the exposed circular portion 200 of the cam surface which portion governs the dwell of the secondary impeller at its lowest position. In Fig. 21 the lobe 191 is shown set at a very short distance from the lobe 190 so as to give only a short dwell of the secondary impeller in its low position, while in Fig. 22 the lobe 191 is shown set so as to give a dwell of the secondary impeller in its low position five times as long as that shown in Fig. 21. The cam lobes may be removed and exchanged for others giving the secondary impeller a rise or fall of any desired character. Fig. 23, for instance, shows a lobe 194 governing the rise, and a lobe 195 governing the fall, which give a slower rise and fall of greater duration than do the lobes shown in Fig. 21. Fig. 24 on the other hand shows lobes which give a quicker rise and fall of shorter duration than Fig. 21.

These cams for the secondary impeller are driven as follows. The main drive shaft which revolves in the direction shown by the arrow, carries a bevel gear 196 (Figs. 10 and 11) which is keyed to it. This bevel gear drives an idler pinion 197 which in turn meshes with teeth cut in the right hand face of the secondary impeller cam 183 which is thus rotated in the direction indicated by the arrow. The idler pinion 197 is carried by a stud 198 fixed in the lever 201 revoluble about the shaft 33 by means of a screw adjustment. The adjusting screw 202 carrying the hand wheel 203 and the fixed collars 204 is guided by a bearing in the bracket 205 and its longitudinal position is fixed by the collars. The screw is threaded into a socket 206 pivoted to the lever 201 by the pivot 207. Turning the hand wheel 203 rocks the lever 201 about the shaft 33 moving the pinion 197 and advancing or retarding the secondary impeller cam 183 relative to the drive bevel gear 196. Thus, and by similar mechanism, the times of operation of the primary and secondary impellers may be independently advanced or retarded in their timed relation to each other and to the rest of the machine.

One effect of advancing or retarding the secondary impeller cam is to make the rise of the impeller earlier or later relative to the severing operation. The rapidity of the rising movement of the secondary impeller during the severing operation may thus be varied by taking advantage of the contour of the cam lobe 190 above described, which is preferably shaped to give a gradually increasing speed to the impeller during the first part of its rise. By advancing the secondary impeller cam relative to the shear cams, the secondary impeller may be made to rise more rapidly during severing and by retarding the cam the secondary impeller may be made to rise more slowly during severing. The cam may also be set so that the secondary impeller begins to rise after the severing is partially done.

The delivery chute 208 is formed of porous material such as carbon and is placed in a sloping position as shown in Fig. 2 with its upper end under the outlet 3 to receive the separated mold charges, and with its lower end over the mold charging station of the shaping machine as shown in plan in Fig. 4. The chute is supplied with water through a flexible tube 210 which connects with a recess 211 formed in the upper end of the chute. A valve 212 regulates the water supply so that only sufficient water is supplied to moisten the chute. When the glass falls on the chute the water is turned to steam where the glass touches it, so that the glass slides freely and rapidly down the chute on a film of steam and drops into the mold 213. The chute is supported on pivots 214 and 215 so mounted that it may be swung out of or into the glass receiving position to interrupt or resume the delivery of the mold charges to the molds as desired. When the chute is swung out, the glass drops through an opening in the base 31 into a suitable receptacle.

In operating with both impellers, the primary impeller periodically raises and lowers the depth of the glass in the temporary container 2 as shown in Figs. 8 and 9, and the discharge of glass due to this depth is modified by the action of the secondary impeller which reciprocates toward and from the outlet in timed relation to the primary impeller. The molten glass issues from the outlet at a periodically varying rate under the combined influence of the gravity head created by the primary impeller 4 and of the accelerating and retarding action of the secondary impeller 5, accumulating in gathers which are successively suspended from the outlet ring and from the end of the secondary impeller. For each complete stroke of the primary impeller there is a vertical reciprocation of the secondary impeller and a reciprocation of the shears which sever a mold charge from each suspended gather. After each severing operation the freshly cut end or stub remaining below the outlet and forming the lower end of the succeeding gather is moved upwardly, or its downward movement is retarded by the action of the secondary impeller.

By using appropriate sizes of outlet ring and secondary impeller, and by properly setting the various adjustings, the shape of the top, body, and lower end of the mold charges may be varied separately at will as hereinafter described. The secondary impeller acts upon the glass partly by displacement and partly by adhesion of the glass to it. Consequently as the secondary impeller moves downward it gives a downward or extrusion impulse to the glass issuing from the outlet. This extrusion impulse aids the gravity head at the outlet and increases the rate of discharge of the glass. As the secondary impeller moves upward, it gives an upward or intrusion impulse to the glass within and below the outlet. This intrusion impulse opposes the gravity head at the outlet, tending to retard the discharge of the glass from the outlet and may be made to reverse the motion of the glass within and below the outlet, raising it up to an extent depending upon the extent and strength of the impulse.

The downward or extrusion impulse of the secondary impeller may be used to vary the shape of the body and upper end of the gather and its resulting mold charge. This impulse tends to increase the diameter of the suspended and elongating glass, and especially of the upper end of the gather, in proportion to the extent and strength of the impulse. By advancing the cam lobe 191 in position the extrusion impulse occurs earlier, which tends to increase the diameter at a more medial portion of the gather, rather than the diameter of the upper end only. By retracting the cam lobe 191 in position, it retards the impulse and tends to enlarge the gather at or toward its upper end. Increasing the extent of the downward impulse, which may be done by lengthening the secondary impeller stroke, tends to enlarge more of the gather, as for instance both its medial and upper portions. The strength of the impulse may be varied by varying the working position or size of the secondary impeller and by varying the character of its downward stroke. A lower position tends to give a stronger impulse and vice versa. By changing the cam lobe 191 the character and duration of the downward stroke and therefore of the extrusion impulse, may be varied. A faster downward stroke of shorter duration increases the strength of the impulse by applying it locally to enlarge a more limited portion of the gather. In this manner by proper setting of the various adjustments, the shape of the body and upper end of the gather and its resulting mold charge may be varied at will.

Adjusting the secondary impeller cam 183 to a position in which it will cause the impeller to raise or reverse the glass adjacent to the outlet while the shears are severing, the upward or intrusion impulse of the secondary impeller, coacting with the severing action of the shears, may be used to vary the shape of the lower end of the gather and its resulting mold charge. The contours of the cut glass surface may be varied by varying the cutting speed of the shears as previously described, so that the shape of the stub and therefore of the end of the succeeding mold charge may be controlled. By having the shears cut as quickly as possible, during the raising of the stub, a blunt ended stub is obtained. By having them cut more slowly, as the glass forming the stub is raised by the intrusion impulse, a more pointed stub is obtained. The raising speed of the glass may also be varied by advancing or retarding the intrusion impulse and taking advantage of the gradual increase in upward speed of the secondary impeller during its stroke due to the shape of the cam lobe 190. This is similar to the described manner of varying the shear speed during severing. In this manner various combinations of raising and cutting speeds may be obtained, enabling the shape of the lower end of the mold charge to be varied.

The up-stroke of the secondary impeller and its resulting intrusion impulse may also be used to vary the shape of the gather above the stub left by the severing operation. The initial formation of the stub by cooperation between the intrusion impulse and the shears has already been described. The further elongation of this stub and of the portion of the gather above the stub may be varied by varying the character of that part of the up-stroke taking place after severing. For instance, by retarding the discharge of the glass, the lower part of the gather may be allowed to elongate before the remainder of the gather is allowed to form. By diminishing the retardation and allowing the greater discharge of the glass, the lower part of the gather may be increased in diameter. Various effects may be secured by regulating the timed relationship of the primary and secondary impellers so that the two sets of impulses from these impellers will be properly superimposed. Increasing the length of the secondary impeller stroke increases the extent of the intrusion impulse. The strength of this impulse may also be increased by lowering the working position of the impeller. This gives a varied control over the shape of the gather and especially over the shape of its lower portion.

One effect of raising the glass below the outlet during and immediately after the severing operation is to keep it out of contact with all parts of the shear blades except the immediate cutting edges. This minimizes the chilling of the glass by the relatively colder shear blades and also minimizes the heating of the blades. It is therefore preferable to operate this device with such adjustments as will allow the cut surface of the glass to be raised clear of the shear blades as fast as it is cut.

By raising or lowering the shears they may be made to sever the glass at a higher or lower level, leaving a shorter or longer stub respectively. This length of stub has an influence on the length of the gather. A longer stub tends to elongate the gather and a shorter stub tends to produce a shorter gather. This influence extends to the lower part of the gather especially.

By making use of the combined effect of the primary impeller adjustments and of the secondary impeller adjustments, a large variety of results may be obtained. The periodic variation of glass level in the container 2 may be advanced or retarded relatively to the operation of the secondary impeller so as to obtain the desired acceleration or retardation of discharge, to increase or diminish the diameter of the gather at the desired point, thus giving a great flexibility as well as range of control.

One of the advantages of the illustrated embodiment of the invention over that type of glass feeding machine which employs a relatively large impeller or plunger over the outlet, is in the more uniform heat distribution in the mold charge. This desirable result is obtained by the use of an impeller of comparatively small diameter which greatly reduces the screen or shadow effect of a larger impeller, which cuts off the direct radiation of heat from the furnace in the rear to the front of the forehearth, and thereby produces a chilled zone on the front of the mold charge. By the use of a small impeller as described, this chilling of the glass is reduced to a minimum and to all practical purposes entirely removed.

The organized machine shown and described herein as a preferred embodiment of this invention is only one of many possible embodiments of the invention. It should be understood that the various features of the invention may be modified, both in structure, combination and arrangement, to adapt the invention to different uses or different conditions of service.

In this application, which is filed as a division of my original application, Ser. No. 294,793, filed May 5, 1919, on which Patent No. 1,655,392 was granted to me January 3, 1928, the claims are directed to glass feeding apparatus embodying, as one of its elements, a container for the glass having a discharge outlet uncontrolled during feeding, or to methods which include steps involving the use of such container, and such claims have a basis in the disclosures of Figs. 7 and 8 of the drawings, and of the specification relating thereto.

Having thus described my invention what I claim and desire to secure by Letters Patent is:—

1. In glass feeding apparatus, a container for molten glass having a continuously open delivery outlet below the glass level and uncontrolled during feeding, and means operating in the glass in the container for periodically causing lateral movement of part of the glass in the container in such manner that such lateral movement of glass in the container impels glass through said outlet.

2. In a glass feeding apparatus, a container for molten glass having a continuously open delivery outlet below the glass level and uncontrolled during feeding, means operating in the glass in the container for periodically causing lateral movement of part of the glass in the container in such manner that the lateral movement of glass in the container impels glass through said outlet, and means acting below said outlet for periodically severing mold charges from the issued glass in timed relation to the lateral movements of glass in the container.

3. The method of separating molten glass into mold charges, which comprises discharging the glass from a container through a submerged outlet uncontrolled during feeding, periodically accelerating the discharge by increasing the depth of glass in the container over the outlet, and severing successive mold charges from the discharged glass, the acceleration of the discharge taking place during such increase of depth in the container.

4. The method of separating molten glass into mold charges, which comprises discharging the glass from a container through a submerged outlet uncontrolled during feeding, periodically accelerating the discharge by increasing the depth of glass over the outlet to time the accumulation of successive gathers of glass beneath the outlet, and severing a mold charge from each gather, the periodic acceleration of discharge taking place during such increase of depth of glass over the outlet.

5. The method of separating molten glass into mold charges, which consists in discharging the glass through a submerged outlet uncontrolled during feeding, periodically accelerating and retarding the discharge by increasing and decreasing the depth of glass over the outlet, and severing successive mold charges from the discharged glass.

6. The method of segregating molten glass from a container into mold charges, which consists in discharging the glass through a submerged outlet uncontrolled during feeding, maintaining constant pressure on the surface of the glass, and periodically raising and lowering the surface of the glass to time the accumulation of charges formed below the outlet.

7. The method of separating molten glass from a container into mold charges, which consists in discharging the glass through a submerged outlet which is uncontrolled during feeding while maintaining constant pressure on the surface of the glass, periodically varying the depth of glass over the outlet and severing successive mold charges from the discharged glass in timed relation to the depth variations.

8. The method of separating molten glass from a container into mold charges, which consists in discharging the glass through a submerged outlet which is uncontrolled during feeding while maintaining constant pressure on the surface of the glass, periodically accelerating the discharge by increasing the depth of glass over the outlet, and severing mold charges from the discharged glass.

9. The method of separating molten glass from a container into mold charges, which consists in discharging the glass through an outlet below the surface of the glass in the container and uncontrolled during feeding while maintaining constant pressure on the surface of the glass, periodically retarding the discharge by decreasing the depth of glass over the outlet, and severing charges from the discharged glass.

10. The method of separating molten glass from a container into mold charges, which consists in discharging the glass through a submerged outlet uncontrolled during feeding while maintaining constant pressure on the surface of glass, and periodically accelerating and retarding the discharge by increasing and decreasing the depth of glass over the outlet.

11. In apparatus for separating molten glass into mold charges, the combination with a container for the glass having a submerged outlet uncontrolled during feeding, of means for varying the depth of glass over the outlet in periodic cycles while maintaining normal atmospheric pressure on the glass, and means for changing the amount of such variation.

12. In apparatus for separating molten glass into mold charges, the combination with a container for the glass having a submerged outlet uncontrolled during feeding, of means for periodically increasing the depth of glass over the outlet during the issue of glass through said outlet, and means for varying the amount of such increase of depth over the outlet.

13. The combination of a receptacle to contain molten glass, said receptacle having an outlet uncontrolled during feeding through which the glass is discharged, means for causing a periodic surging of the glass back and forth in the receptacle, said outlet being so located that said movement of the glass in the receptacle causes a periodically fluctuating discharge through the outlet.

Signed at Hartford, Connecticut, this 18th day of October, 1923.

KARL E. PEILER.